United States Patent [19]

Mason

[11] 3,732,510

[45] May 8, 1973

[54] MULTISECTION PRECISION-TUNED MONOLITHIC CRYSTAL FILTERS

[75] Inventor: Warren Perry Mason, West Orange, N.J.

[73] Assignee: Bell Telephone Laboratories, Incorporated, Murray Hill, N.J.

[22] Filed: Oct. 12, 1970

[21] Appl. No.: 79,881

[52] U.S. Cl. ........................333/72, 333/30, 310/8.2

[51] Int. Cl. ............................H03h 7/10, H03h 9/00

[58] Field of Search............................333/72, 30, 71; 310/8.2, 9.5

[56] References Cited

UNITED STATES PATENTS

| | | | |
|---|---|---|---|
| 3,609,601 | 9/1971 | Phillips | 333/72 |
| 3,602,884 | 8/1971 | Sykes | 333/72 |
| 3,585,537 | 6/1971 | Smith et al. | 333/72 |
| 3,573,672 | 4/1971 | Fair | 333/72 |
| 3,569,873 | 3/1971 | Beaver | 333/72 |
| 3,544,926 | 10/1968 | Hurtig | 333/72 |

*Primary Examiner*—Herman Karl Saalbach
*Assistant Examiner*—Saxfield Chatmon, Jr.
*Attorney*—R. J. Guenther and Edwin B. Cave

[57] ABSTRACT

In a monolithic crystal filter characterized by a combination of mass loading and acoustic coupling, passband shaping is enhanced by shunting one or more intermediate electrode pairs with a reactive element. Precision tuning is achieved by varying the plating on a desired intermediate filter section with adjacent sections either open-circuited or reactively shunted.

9 Claims, 11 Drawing Figures

INVENTOR
W. P. MASON
BY [signature]
ATTORNEY

PHASE SHIFT OF $\Gamma \ell_2$

MULTISECTION PRECISION-TUNED MONOLITHIC CRYSTAL FILTERS

BACKGROUND OF THE INVENTION

1. Field of the Invention

This invention relates to multisection monolithic crystal filters and more particularly to both methods and to combinations of means for effecting the precision tuning of such filters.

2. Description of the Prior Art

Monolithic crystal filters are now well known in the filter art and are described, for example, by W. D. Beaver and R. A. Sykes in their application, Ser. No. 558,338, filed June 17, 1966, now U.S. Pat. No. 3,564,463 issued Feb. 16, 1971. In the simplest type of monolithic crystal filter, the filter structure is formed by sandwiching a piezoelectric wafer between one pair of electrodes that serves as an input and between another pair of electrodes, spaced from the first pair, that serves as an output. By means of a particular size, density and position relation between any electrode pair and its corresponding wafer secton, such a combination or section being termed a resonator, a condition defined as mass loading is established. Mass loading is evidenced primarily by the phenomenon that acoustic energy supplied in or near to any one of the resonators is essentially confined or trapped within the boundaries of that resonator so that very little escapes to the surrounding piezoelectric body. Moreover, as a result of a substantial difference between the resonant frequency of the resonators and the resonant frequency of the unloaded portion of the piezoelectric body, the relatively limited amount of acoustic energy that in effect does escape from the trapping zone of the resonator decreases exponentially in magnitude as the distance from the resonator increases. Consequently, the contour and dimensions of the outer perimeter of the piezoelectric body surrounding a resonator characterized by mass loading have virtually no effect on the nature of the energy translation achieved by the device.

By means of a particular size, position and distance relation between adjacent resonators, which relation is defined as acoustic coupling, each electrode pair in a monolithic crystal filter is positioned within the acoustic field of each adjacent pair. Moreover, the only physical path between the input and output resonators is in the piezoelectric body and substantially all of the energy transferred from one resonator to the other is acoustic energy.

As a result of combining the phenomena associated with mass loading and acoustic coupling to form a monolithic crystal filter as taught by Beaver and Sykes, the image impedance of the structure or circuit as a whole is found to conform to a specifically defined pattern. Further, the structure or circuit as a whole may be identified by an equivalent circuit in the form of a lattice, the resonant and antiresonant frequencies of which are characterized by a specifically defined relation. The "defined pattern" and the "defined relation" referred to immediately above are set forth in detail by Beaver and Sykes in the cited application. Characteristics of such filters as compared to earlier multisection crystal filters include smaller size, lower cost, enhanced simplicity and greater flexibility in shaping the passband. It is to be understood that the term "-monolithic crystal filter" as used herein refers to the monolithic crystal filter as described in general above and as taught specifically by Beaver and Sykes.

Despite the advantageous characteristics of monolithic crystal filters as noted above, the continuing increase in demand for maximum utilization of the frequency spectrum in communication systems has established a need for a degree of accuracy and precision in filter passbands that prior art structures have been unable to meet.

One approach toward meeting the indicated need for enhanced precision in the passband characteristics of monolithic crystal filters is illustrated by R. L. Reynolds and R. A. Sykes in their application Ser. No. 723,676, filed Apr. 24, 1968. This approach employs one or more intermediate electrode pairs positioned between the input and output electrodes, and it has been found that passband shaping is enhanced to some degree by shorting and grounding these intermediate electrode pairs. Another approach to the problem is disclosed by W. L. Smith and R. A. Sykes in their application Ser. No. 723,677, filed Apr. 24, 1968, where a respective discrete inductive element is placed in circuit combination with both the input resonator and the output resonator.

Outside of the monolithic crystal filter field, it is common to employ discrete reactive elements as coupling devices for otherwise discrete filter sections, and it is known that the type and magnitude of such reactive elements affect bandpass shaping. That type of bandpass control is entirely inapplicable to monolithic crystal filters, however, where coupling must be entirely acoustic.

The prior art steps indicated above which have been taken to improve passband shaping capabilities in monolithic crystal filters have been directed primarily at very specific passband design problems rather than being directed toward the enhancement of precise passband tailoring capabilities in general. Accordingly, a general object of the invention is to improve both the methods and means for shaping the passband characteristics of a monolithic crystal filter.

SUMMARY OF THE INVENTION

The stated object and additional objects are achieved in accordance with the principles of the invention by a monolithic crystal filter which employs input and output electrode pairs or resonators in combination with one or more intermediate resonators which are positioned between the input and output resonators. In accordance with the invention, at least one of the intermediate resonators, rather than being conventionally short-circuited, is shunted by a reactive element, that is, a capacitive element or an inductive element depending upon the structure of the particular filter and upon the characteristics of the desired passband. It has been found that the effect of a capacitance termination is to raise the minimum frequency of the passband over the value that is obtained for the conventional shorted electrode case. If the ratio of the crystal capacitance to the total capacitance is small, a similar type of characteristic is obtained and, in accordance with the invention, this means may be employed to adjust all of the adjacent sections to the same mean frequency. It has also been discovered that as the ratio of the internal crystal capacitance to the total capacitance approaches unity, an open circuit condition, the passband becomes very asymmetric and the characteristics of adjacent sections do not match. This condition, it has been found, if not corrected by compensating capacitances taught by the invention, results in internal reflection of the energy transmitted through the filter and in loss of symmetry in the total attenuation characteristic.

In accordance with another feature of the invention, a part of the internal capacitance of an intermediate resonator is annulled by the use of a shunting inductance which causes an increase in the resonant frequency of that resonator. Additionally, the use of a shunting inductance in the manner indicated has the effect of making the resonator's characteristic impedance $Z_c$ approach more closely the characteristic impedance $Z'_o$ of an indefinite unplated crystal. In accordance with the invention, this principle is utilized as the basis for a process by which an inductance is shunted across the resonators on either side of a filter section whose resonant frequency is to be permanently adjusted by a variation in the degree of plating or loading. In this way the resonant frequency of a resonator under adjustment can be made virtually identical to that of an isolated trapped energy resonator. As a result, substantial improvements are attained in passband accuracy as well as in overall filter stability.

Under different conditions involving different filter structures and different passband requirements, it has been found in accordance with the invention that preferred tuning results are achieved by adjusting the resonant frequency of each intermediate section by open-circuiting the section on either side and increasing the plating on the desired section until its resonant frequency reaches the desired value.

DETAILED DESCRIPTION

Figure 1:
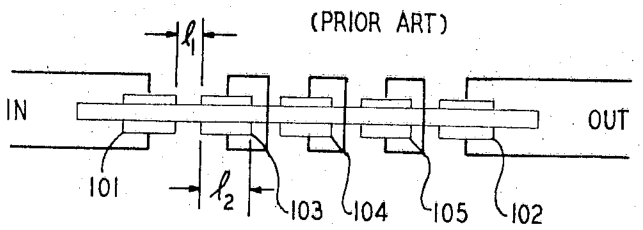
FIG. 1 (PRIOR ART)
FIG. 1 is a sketch of a monolithic crystal filter in accordance with the prior art.

Monolithic crystal filters in the prior art are constructed, as shown in FIG. 1, by inserting between the input resonator 101 and the output resonator 102 one or more intermediate resonators such as 103, 104 and 105, consisting of unplated crystal sections of length $l_1$ separated by plated sections of length $l_2$, the intermediate electrodes being short-circuited. It has been found in accordance with the invention, however, that superior results, insofar as bandpass shaping is concerned, are achieved when the electrodes of one or more of the intermediate resonators such as resonator 104, for example, are shunted by an external reactive element, shown in FIG. 2 as either $C'_A$ or $l'_A$. In accordance with the invention, a shunting reactive element may be used with one ore more of the intermediate resonators of a monolithic crystal filter in either one or in both of two different ways. First, with particular combinations of filter size, proportions and materials and with particular degrees of acoustic coupling and mass loading, it has been found useful to employ a shunting reactive element as a permanent part of one or more of the intermediate resonators of a monolithic crystal filter in order to achieve desired goals of bandpass shaping.

Figure 2:
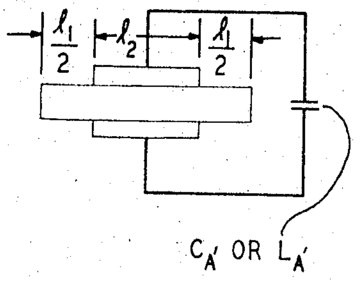
FIG. 2 is a schematic circuit diagram of an illustrative single intermediate section of a filter in accordance with the invention.
Figure 2A:
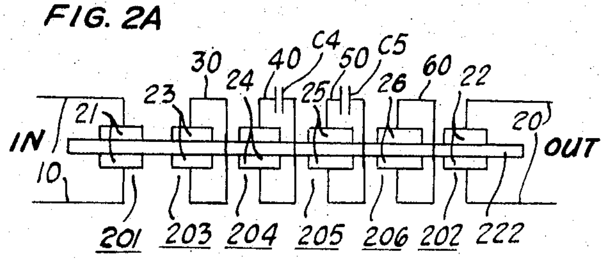
FIG. 2A is a sketch and schematic circuit diagram of a monolithic crystal filter in accordance with the invention.

Such a filter is illustrated in FIG. 2A where 5common piezoelectric wafer 222 is shown sandwiched between electrode pairs 21 through 26 to form an input resonator 201, an output resonator 202, and intermediate resonators 203, 204, 205 and 206. The electrode pairs 23 and 26 of intermediate resonators 203 and 206 are short-circuited conventionally by shunting paths 30 and 60, respectively. In accordance with the invention, however, the electrode pair 24 of resonator 204 is shunted by a floating, ungrounded, conducting path 40 which includes a capacitor $C_4$. Similarly, the electrodes 25 of the intermediate resonator 205 are shunted by a floating, ungrounded, conducting path 50 which includes a capacitor $C_{\%}$. Input leads 10 are connected to the input resonator 201, and output leads 20 are connected to the output resonator 202. Secondly, or alternatively, the use of a shunt reactive element, generally an inductor, for temporary connection with each of a particular pair of intermediate nonadjacent filter sections or resonators has been found to be an effective aid when employed during the tuning of another intermediate resonator located between that particular pair. Thus, for example, resonators 103 and 105 of FIG. 1 may, in accordance with the invention, be temporarily shunted with an inductor, not shown, while resonator 104 is being adjusted by plating additional material on the electrodes until its resonant frequency reaches a desired value. Also in accordance with the invention, depending upon the filter characteristics and the band shaping qualities desired, it has been found effective in some instances to temporarily open-circuit resonators such as 103 and 105 while adjusting the tuning of a center section or resonator such as 104.

Investigations based on both theoretical concepts and on laboratory tests show that the highest degree of accuracy in tuning an individual section of a multisection monolithic crystal filter is achieved when that section is effectively isolated from adjacent sections so that the characteristic impedance of the section to be tuned more closely approaches the characteristic impedance $Z'_o$ of an infinite unplated crystal. In accordance with the invention, it has been found that in those cases where it has been useful to annul a part of the internal capacitance of a filter section either temporarily while tuning, or permanently, by shunting an inductance across the electrodes thereof, the effect has been to raise the center frequency of the passbands of adjacent filter sections. This upward shift in frequency is known to be an indication of a closer approach to an impedance of $'_o$ for the affected resonator.

The basic principles of the invention rest on and have been derived from sound theoretical foundations. A broad understanding of these foundations may be gained from following an abbreviated derivation of the acoustic and equivalent network equations for an intermediate section or resonator which has a finite reactive termination, in this case a capacitance for illustrative purposes, in contrast to the conventional short-circuit termination. The section to be analyzed is shown in FIG. 2. As indicated, it consists of a length $l_{1/2}$ of unplated crystal on either side of a plated section of length $l_2$, the plated section being terminated in an external capacitance $C'_A$. Since the bandwidth of such a monolithic filter section is very small, the effect of an inductance can be represented by making $C'_A$ negative. It can be shown that the propagation constant $\theta$ and the characteristic impedance $Z_I$ can be derived from the following equations:

$$\cos h\theta=\cos \xi l_2 \cos h\eta l_1+j\left(\frac{Z_0}{Z_0'}+\frac{Z'_0}{Z_0}\right)\sin \xi l_2 \sin h\eta l_1 \tag{1A}$$

$$Z_c=Z_0\sqrt{\frac{\sin \xi l_2\left[\cos h^2\frac{\eta l_1}{2}+\left(\frac{Z'_0}{Z_0}\right)^2\sin h^2\frac{\eta l_1}{2}\right]+\frac{Z'_0}{jZ_0}\sin h\eta l_1 \cos \xi l_2}{\sin \xi l_2\left[\cos h^2\frac{\eta l_1}{2}+\left(\frac{Z_0}{Z'_0}\right)^2\sin h^2\frac{\eta l_1}{2}\right]+\frac{Z_0}{Z'_0}\sin h\eta l_1 \cos \xi l_2}} \tag{1B}$$

where $\xi$ and $\eta$ are the propagation constants of the plated and unplated sections respectively and $Z_o$ and $Z'_o$ are the characteristic impedances of the plated and unplated sections respectively. These constants and impedances may be expressed in the following terms:

$$\xi=\frac{\bar{K}}{h}\sqrt{\omega^2/\omega_p^2-1};\ \eta=\frac{K}{h}\sqrt{1-\omega^2/\omega_c^2} \tag{2}$$

$$Z_0=\frac{2\bar{k}_1^2\bar{K}c_{66}(\omega/\omega_p)^2}{\omega\sqrt{\omega^2\omega_p^2-1}};\ Z'_0=j\left[\frac{2Kk_1^2c_{66}(\omega/\omega_c)^2}{\omega\sqrt{1-\omega^2/\omega_c^2}}\right],$$

where $k^2 I = \pi^2/12$ ; $\bar{k}^2 1 = \pi^2 (1+3R)/12(1+R)^2$; $c_{66}$ is the shear elastic modulus, $k^2 = 3k^2{}_1 c_{66}/\gamma_{11}$; $\bar{k}^2 = 3\bar{k}^2{}_1 c_{66}/\gamma_{11}$ and where $\gamma_{11}$ is the Voigt stretch modulus. For AT cut quartz $c_{66} = 29.01$ and $\gamma_{11} = 85.93$ in units of $10^{10}$ dynes/cm$^2$. The angular frequency $\omega_p$ is the frequency for a completely plated shear crystal and $\omega_c$ the frequency for the unplated crystal. These have the values $$\omega_p^2=\frac{3\bar{k}_1^2c_{66}}{\rho h^2}=\frac{\pi^2}{4h^2(1+R)^2}\left(\frac{c_{66}}{\rho}\right) \tag{3}$$

$$\omega_c^2=\frac{3k_1^2c_{66}}{\rho h^2}=\frac{\pi^2}{4h^2}\left(\frac{c_{66}}{\rho}\right).$$

In these equations, $2h$ is the thickness of the unplated crystal, $\rho$ is the density of the crystal and $R$ is the so-called plate-back ratio which represents the ratio of the mass per unit area of the electrode pair to the mass per unit area of the crystal plate.

Figure 3:
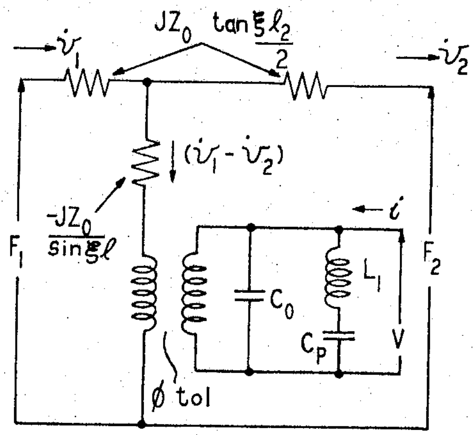
FIG. 3 is a diagram of an equivalent circuit of the filter section of FIG. 2.
Figure 4A:
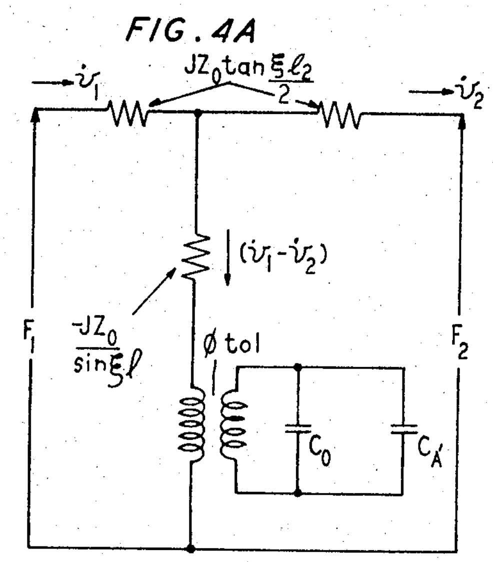
FIG. 4A and FIG. 4B are variants of the circuit shown in FIG. 3.
Figure 4B:
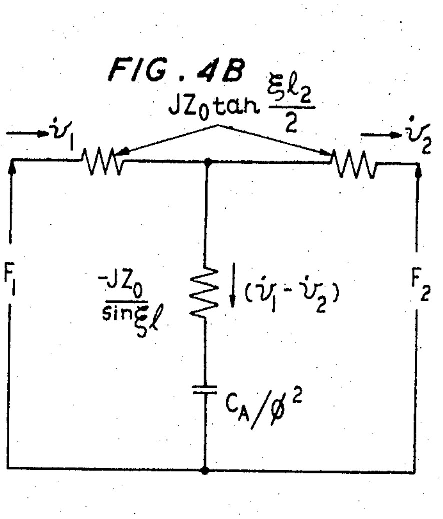

The effect of terminating the electrodes in a finite capacitance is to change the values of $\xi l_2$ and $Z_o$ to $\Gamma l_2$ and $Z_I$, respectively. With these changes, the identities of Equations (2) can be used to calculate the propagation constant and characteristic impedance of the complete filter section. The values of $\Gamma l_2$ and $Z_I$ can also be calculated with the aid of the equivalent electrical circuit of a trapped energy resonator. FIG. 3 shows a circuit which is the electrical equivalent of the single filter section shown in FIG. 2. The electrical representation in FIG. 3 includes a T network having values determined by the short-circuited constants of Equations (2). The electromechanical transformer has an impedance transformation ratio $\phi$ as follows:

$$\varphi=[e_{26}(\omega^2/\omega^2_p)]/(\omega^2/\omega^2_p-1), \tag{4}$$

where $e_{26}$ is the shear piezoelectric constant which relates the stress to the applied electric field. $C_o$ represents the static capacitance of the crystal which is equal to $wl\epsilon^T{}_{22}/2h$ where $wl$ is the cross-sectional area of the electrodes, $\epsilon^T{}_{22}$ the free dielectric constant of the crystal and 2h the thickness of the crystal. The effective dielectric constant $\epsilon$ may be expressed as follows:

$$\epsilon=\epsilon T_{22}\left[1-\frac{k^2(\omega/\omega_p)^2}{(\omega^2/\omega_p^2-1)}\right] \tag{5}$$

where $k^2$ is the square of the electromechanical coupling factor. For a ratio of capacitances $C_o/C_1$ of 250 to 1, $k^2$ becomes 0.0049 and the dielectric constant becomes zero at a frequency of $\omega/\omega_p = 1.00245$; above this frequency the dielectric constant quickly returns to $\epsilon^m{}_{22}$. The effect of this deviation of $\epsilon^T{}_{22}$ is to produce a slight change in the phase shift of $\Gamma l_2$ as indicated by the dashed line of FIG. 5, but in the region of the filter passband the deviation from the effect of a constant capacitance $C_o$ is small enough to neglect. Hence the circuit analyzed may be considered to be shown by FIG. 4A. $C_o$ represents the static capacitance of the crystal while $C'_A$ is the added external capacitance which may be an inductance if $C'_A$ is negative. The total capacitance is $C_o + C'_A = C_A$ and all the curves are plotted as a ratio of $C_o/C_A$. The circuit analyzed is then the circuit of FIG. 4B.

The two network equations are $$F_1=\dot{v}_1(jZ_o\tan \xi l_2/2)+(\dot{v}_1-\dot{v}_2)\,[-(jZ_o/\sin \xi l_2)-(j\phi^2/\omega C_A)AW \tag{6}$$

$$F_1=(jZ_o\tan \xi l_2/2)\,(\dot{v}_1+\dot{v}_2)\,F_2\,.$$

Solving these two equations for $\dot{v}_2$ and $F_2$ in terms of $\dot{v}_1$ and $F_1$ produces results that may be expressed as follows:

$$\dot{v}_2=\dot{v}_1\cos\Gamma l_2-j(F_1/Z_I)\sin\Gamma l_2$$

$$F_2=F_1\cos\Gamma l_2-j\dot{v}_1 Z_I\sin\Gamma l_2, \quad (7)$$

where, $$\cos\Gamma l_2\left[\frac{\cos\xi l_2+\frac{\varphi^2\sin\xi l_2}{\omega C_A Z_o}}{1+\frac{\varphi^2\sin\xi l_2}{\omega C_A Z_o}}\right],$$

$$Z_I=Z_o\sqrt{1+\frac{2\varphi^2\tan\xi l_2/2}{\omega C_A Z_o}} \quad (8)$$

If $C_A=\infty$ then $\Gamma l_2=\xi l_2$ and $Z_I=Z_o$, the parameters for the short-circuited case.

The resonant frequency of an isolated plating in a large unplated section is given when $\cosh\eta l_1\to\sinh\eta l_1\to\infty$, or $$\frac{\cos\Gamma l_2+j\left(\frac{Z_I}{Z'_o}+\frac{Z'_o}{Z_I}\right)\sin\Gamma l_2=0}{2} \quad (9)$$

Since this is a symmetrical case we expect that it can be expressed in terms of $\Gamma l_2/2$. In fact $$\cot\Gamma l_2=\frac{\cot^2\Gamma l_2/2-1}{2\cot\Gamma l_2/2}=-j\left(\frac{\frac{Z_I}{Z_o'}+\frac{Z_o'}{Z_I}}{2}\right) \quad (10)$$

Solving for $\cot\Gamma l_2/2$ and inserting the values of $$\phi=[e_{26}(\omega/\omega_p)^2]/(\omega^2/\omega^2_p-1);\ \xi l_2=\bar{K}l_2/h\ \sqrt{\omega^2/\omega_p^2-1};$$

$$Z_o=[2\bar{k}^2{}_1\bar{K}c_{66}(\omega/\omega_p)^2]/(\omega\ \sqrt{\omega^2/\omega_p^2-1});$$

$$k^2=e^2{}_{26}/\bar{k}^2{}_1c_{66}\epsilon^T{}_{22};$$

and $$Z'_o=j\,]2Kk^2{}_1c_{66}(\omega/\omega_c)^2]/(\omega\ \sqrt{1-\omega^2/\omega_c^2}) \quad (11)$$

where $k$ is the electromechanical coupling factor, Equation (10) becomes $$\cot\frac{\Gamma l_2}{2}=-\frac{jZ_o'}{Z_I}=\frac{Kk_1^2\omega_p^2\sqrt{\omega^2/\omega_p^2-1}}{\bar{K}\bar{k}_1^2\omega_o^2\sqrt{1-\omega^2/\omega_o^2}}\times\frac{1}{\left(1+\frac{k^2(\omega/\omega_p)^2\tan\frac{\bar{K}l_2}{2h}\sqrt{\omega^2/\omega_p^2-1}}{(\omega^2/\omega_p^2-1)(C_A/C_o)\frac{\bar{K}l^2}{2h}\sqrt{\omega^2/\omega_p^2-1}}\right)^{1/2}} \quad (12)$$

Using the values of Equation (11) and Equation (7) we have for the parameters of $\Gamma l_2$ and $Z_I$, the following expressions:

$$\cos\Gamma l_2=\frac{\cos\frac{\bar{K}l_2}{h}\sqrt{\omega^2/\omega_p^2-1}+\frac{k^2(\omega/\omega_p)^2\sin\frac{\bar{K}l_2}{h}\sqrt{\omega^2/\omega_p^2-1}}{(\omega^2/\omega_p^2-1)(C_A/C_o)\frac{\bar{K}l_2}{h}\sqrt{\omega^2/\omega_p^2-1}}}{1+\frac{k^2(\omega/\omega_p)^2\sin\frac{\bar{K}l_2}{h}\sqrt{\omega^2/\omega_p^2-1}}{(\omega^2/\omega_p^2-1)(C_A/C_o)\frac{\bar{K}l_2}{h}\sqrt{\omega^2/\omega_p^2-1}}} \quad (13)$$

and $$Z_I=\frac{2\bar{k}_1^2\bar{K}c_{66}(\omega/\omega_p)^2}{\omega\sqrt{\omega^2/\omega_p^2-1}}\sqrt{1+\frac{k^2(\omega/\omega_p)^2\tan\frac{\bar{K}l_2}{2h}\sqrt{\omega^2/\omega_p^2-1}}{(\omega^2/\omega_p^2-1)(C_A/C_o)\frac{\bar{K}l_2}{2h}\sqrt{\omega^2/\omega_p^2-1}}} \quad (14)$$

In order to illustrate the use of these equations, a particular example is chosen. This example assumes that $l_2/h=25.0$ and $(1+R)=\omega_c/\omega_p=1.02$. For this condition, there is only one trapped energy band which goes from $$0\ \text{to}\ \pi=\xi=(\bar{K}l_2/h)\ \sqrt{\omega^2/\omega_p^2-1}; \quad (15)$$

hence $\omega/\omega_p$ goes from 1.0 to 1.0094, since $l_2/h=25.0$ and $K=0.921$.

Figure 5:
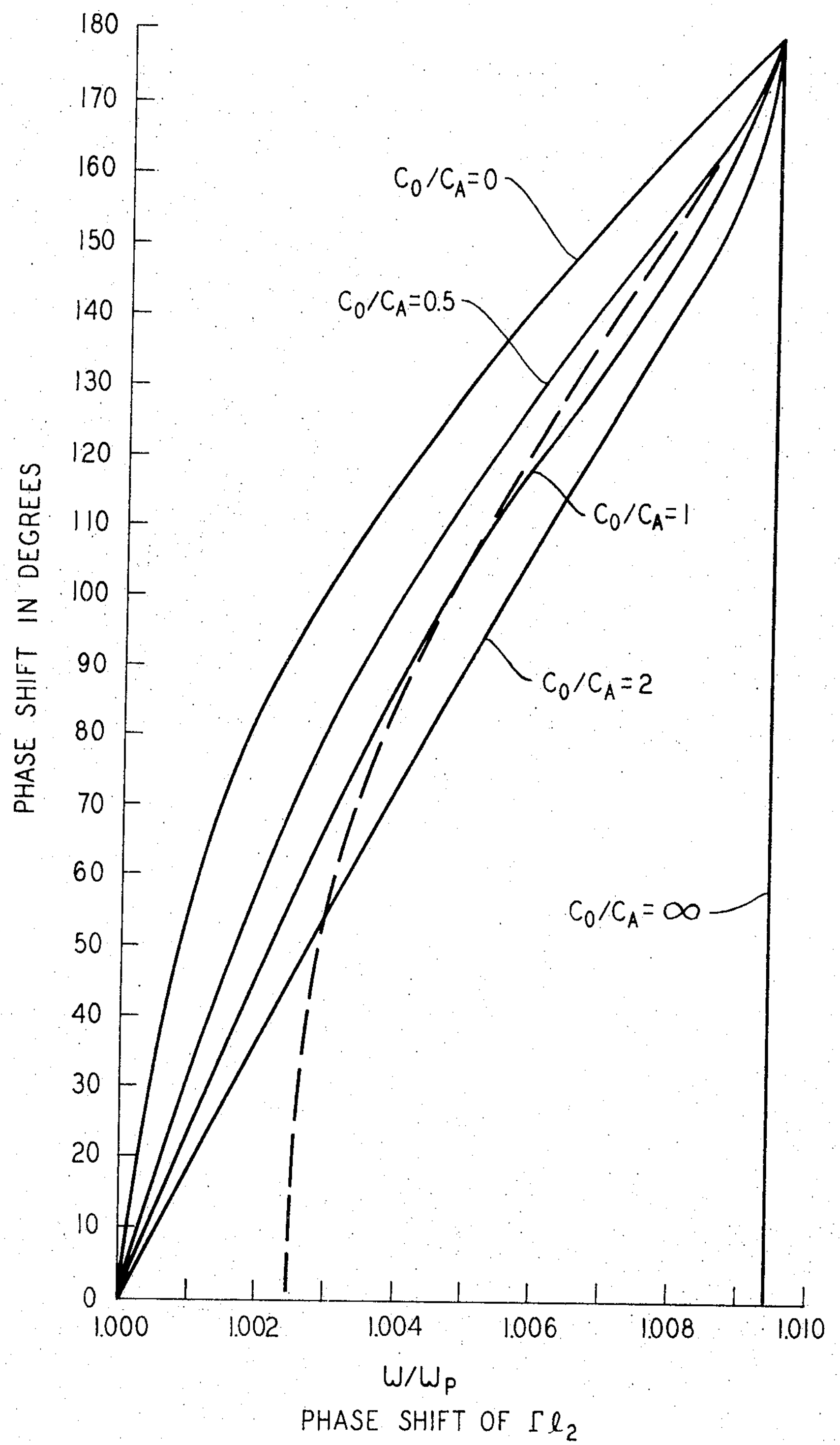
FIG. 5 is a plot of filter phase shift in degrees versus phase shift in the filter propagation constant for a filter section in accordance with the invention.

FIG. 5 curve $C_o/C_A=0$ shows the phase shift in degrees as a function of $\omega/\omega_p$ for the following:

$$\xi l_2=(\bar{K}l_2/h)\ \sqrt{\omega^2/\omega_p^2-1}. \quad (16)$$

This corresponds to the case of the short-circuited crystal. The phase shifts for $\sigma l_2$ can be calculated as a function of the ratio $C_o/C_A$ from Equation (13). Since $\sin\xi l_2$ is zero at both ends of the trapped energy zone, the limits are the same as for $\xi l_2$, namely, $\omega/\omega_p=1.0$ and 1.0094. Curves are also given for $C_o/C_A$ greater than 1 which represents the effect of shunting a coil across the terminal. The case $C_o/C_A=1$ is the open circuited case. These curves have been calculated for the case that $k^2=0.0098$, which has been found to be the coupling factor for a straight crested shear wave. For a ratio of capacitances of 250, which is typical the results are the same as the curve $C_o/C_A=0.5$, which corresponds to a $k^2$ of 0.0049. The curve $C_o/C_A=1$ would then be the one corresponding to the situation where half the internal capacitance is annulled by a shunting inductance. For $C_o/C_A=\infty$, which corresponds to a condition in which all the internal capacitance is annulled by an inductance, the phase shift would be zero up to the upper cutoff after which it would jump to 180°. When the ratio of $C_o/C_A$ is negative, which is to say when the positive reactance is smaller than the negative reactance of $C_o$, the value of $\cos\Gamma l_2$ is greater than unity, and $\Gamma l_2$ becomes imaginary. This corresponds to an attenuation through the plated section. It is thus clear that no passband is possible in this region. The effect of the shunt arm $L_1$ and $C_1$ is shown by the dashed line of FIG. 5 for the case that $k^2=0.0049$. In the region of the passband, the effect is to increase the ratio of $C_o/C_A$ and to raise the frequency of the passband for a given ratio of $C_o/C_A$.

To determine the resonant frequency for an isolated plate, it is necessary to know also the ratio of $jZ_l/Z'_o$. From Equation (12), $$\tan\frac{\Gamma l_2}{2}=\frac{jZ_I}{Z_o'}=\frac{\overline{K}k_1^2\omega_o^2\sqrt{1-\omega^2/\omega_o^2}}{Kk_1^2\omega_p^2\sqrt{\omega^2/\omega_p^2-1}}\sqrt{1+\frac{k^2(\omega/\omega_p)^2\tan\frac{\overline{K}l_2}{2h}\sqrt{\omega^2/\omega_p^2-1}}{(\omega^2/\omega_p^2-1)(C_A/C_o)\frac{\overline{K}l_2}{2h}\sqrt{\omega^2/\omega_p^2-1}}} \quad (17)$$

Figure 6:
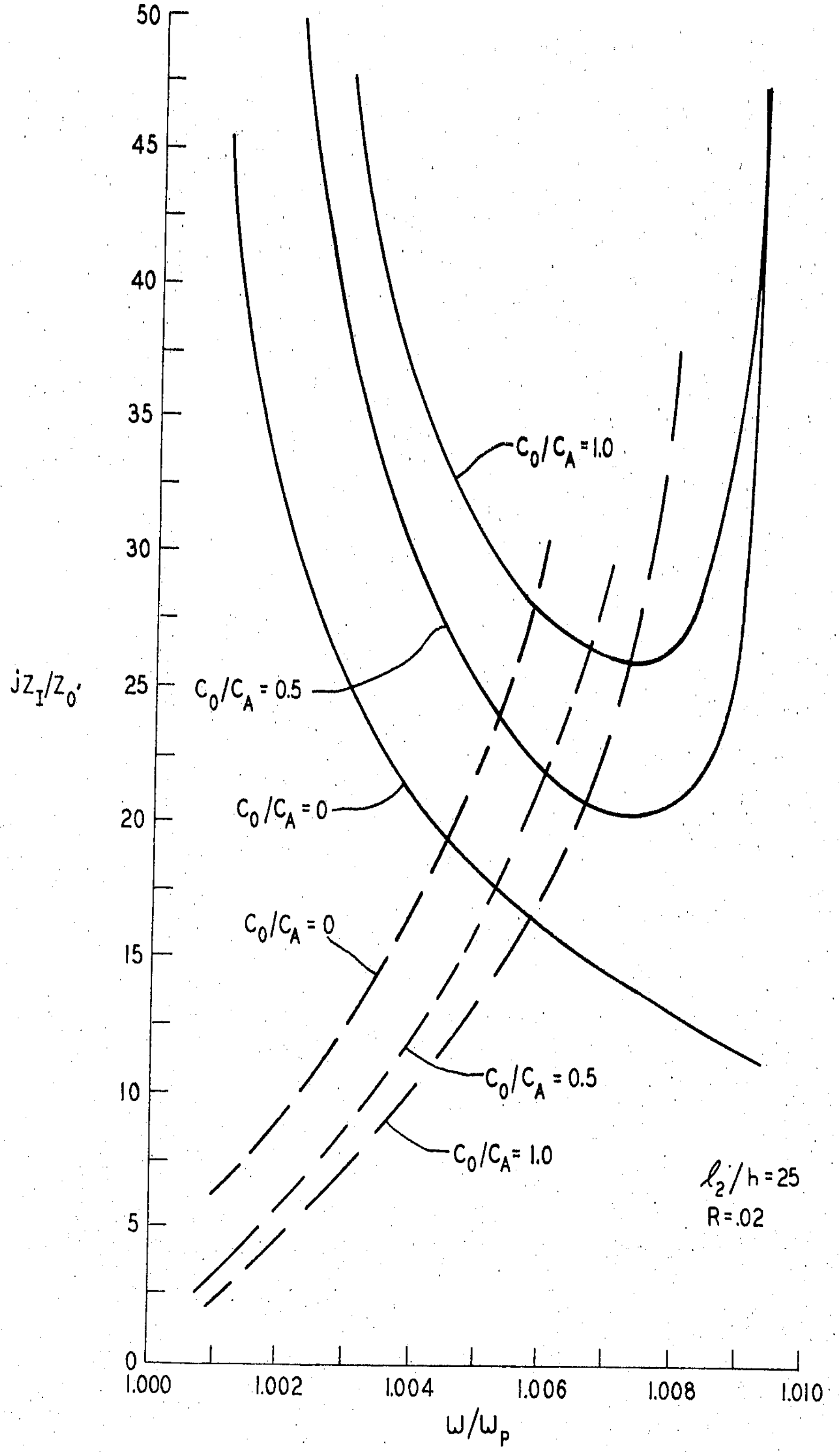
FIG. 6 is a plot of an impedance ratio versus a frequency ratio for different filter capacitance conditions in a monolithic crystal filter.
Figure 7:
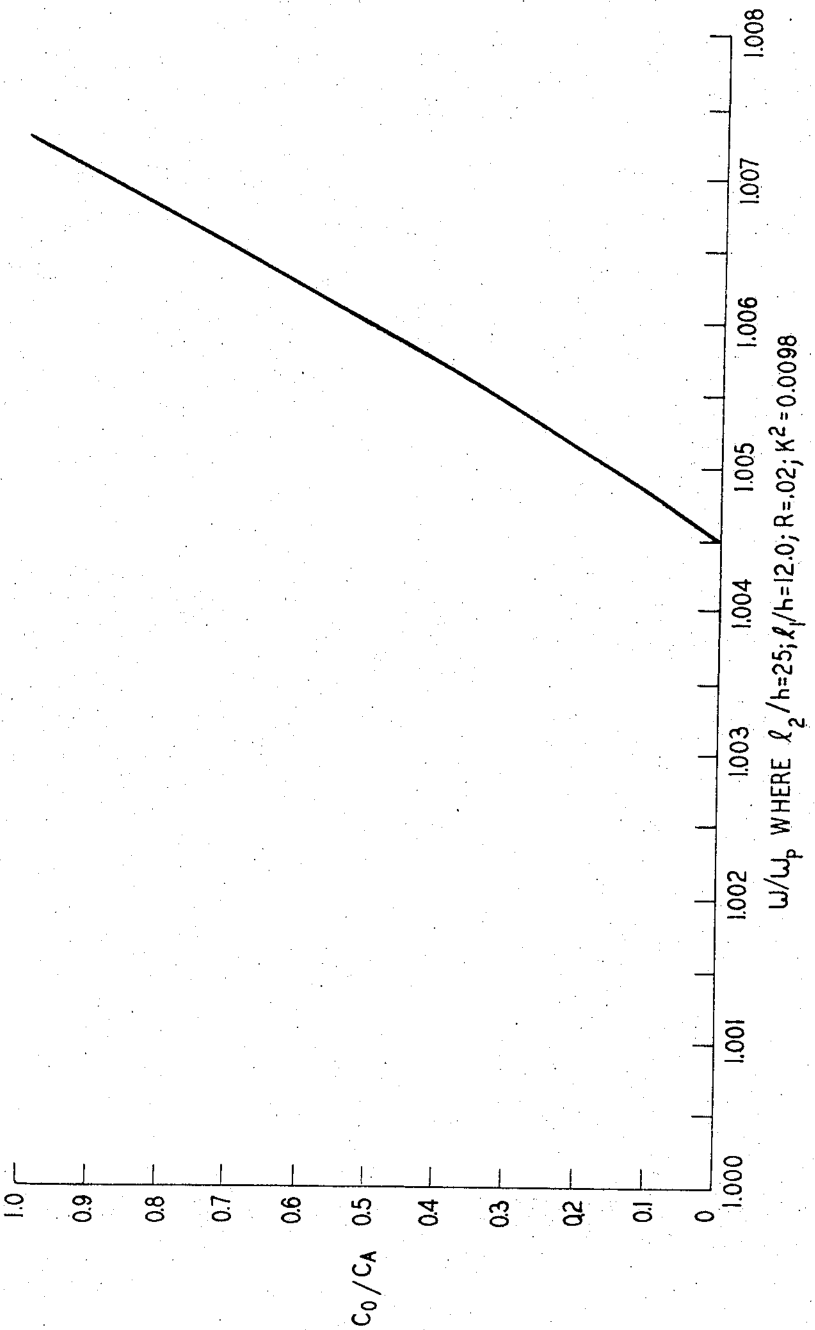
FIG. 7 is a plot enabling the calculation, for a particular set of physical parameters, of the 90 degrees phase shift point as a function of a ratio of filter capacitances.

The value of $\overline{K}\overline{k}^2_1\ \omega^2_c/Kk^2_1\omega^2_p = (1+3.5R) = 1.07$. Using the value of $k^2 = 0.0098$, FIG. 6 shows this ratio for three values of $C_o/C_A$. Using the values of $\Gamma l_2$ from FIG. 5, the values of $\tan \Gamma l_2$ are shown plotted by the dashed lines for the three values of $C_o/C_A$. The intersections of these two sets of curves determine the values of the resonant frequencies for the isolated plates. The solid lines shown in FIG. 7 plot these intersections as a function of the ratio $C_o/C_A$.

Figure 8:
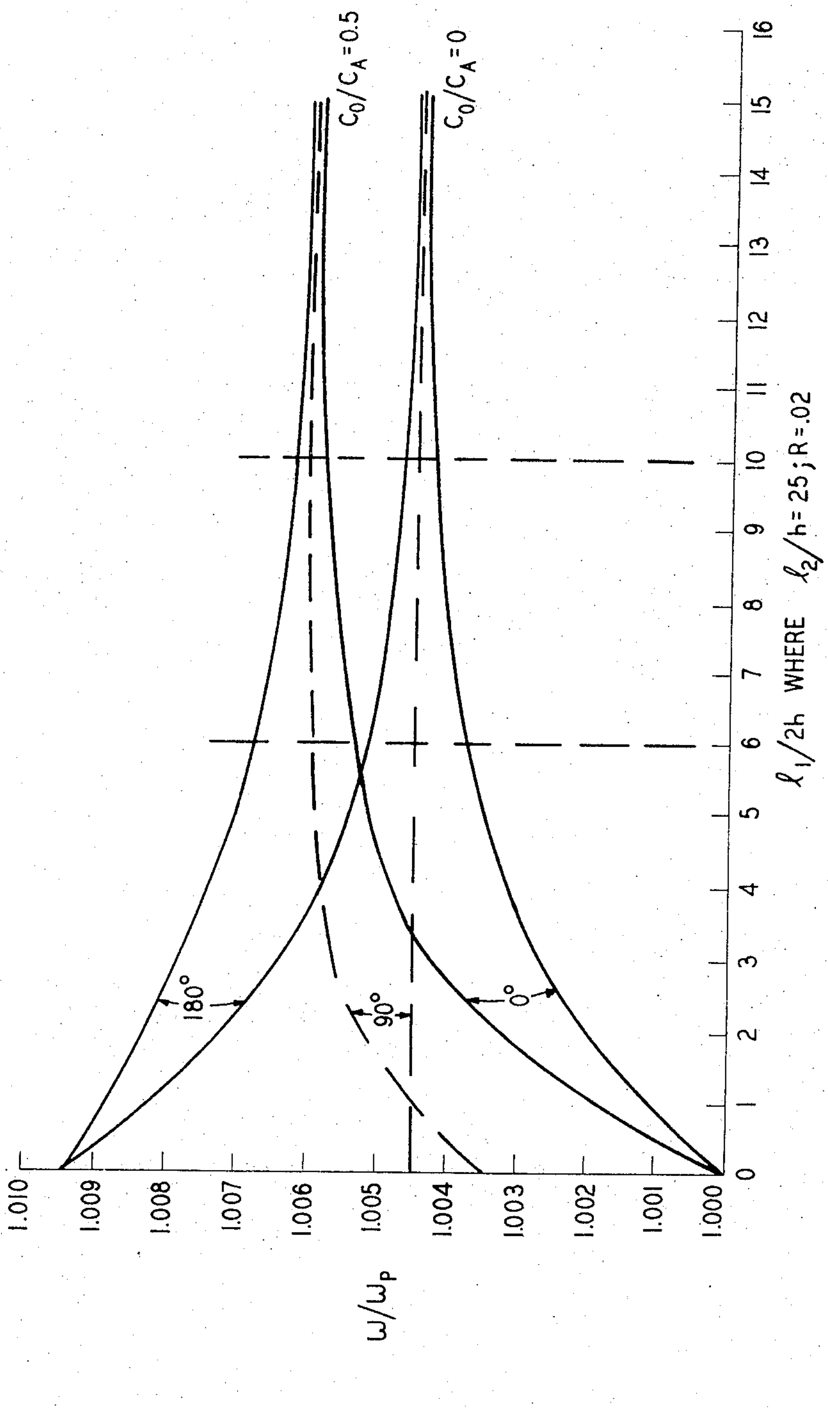
FIG. 8 is a set of curves enabling the calculation of the bandwidth as a function of the ratio of stated physical parameters of a crystal section for stated ratios of internal to external capacitances.
Figure 10:
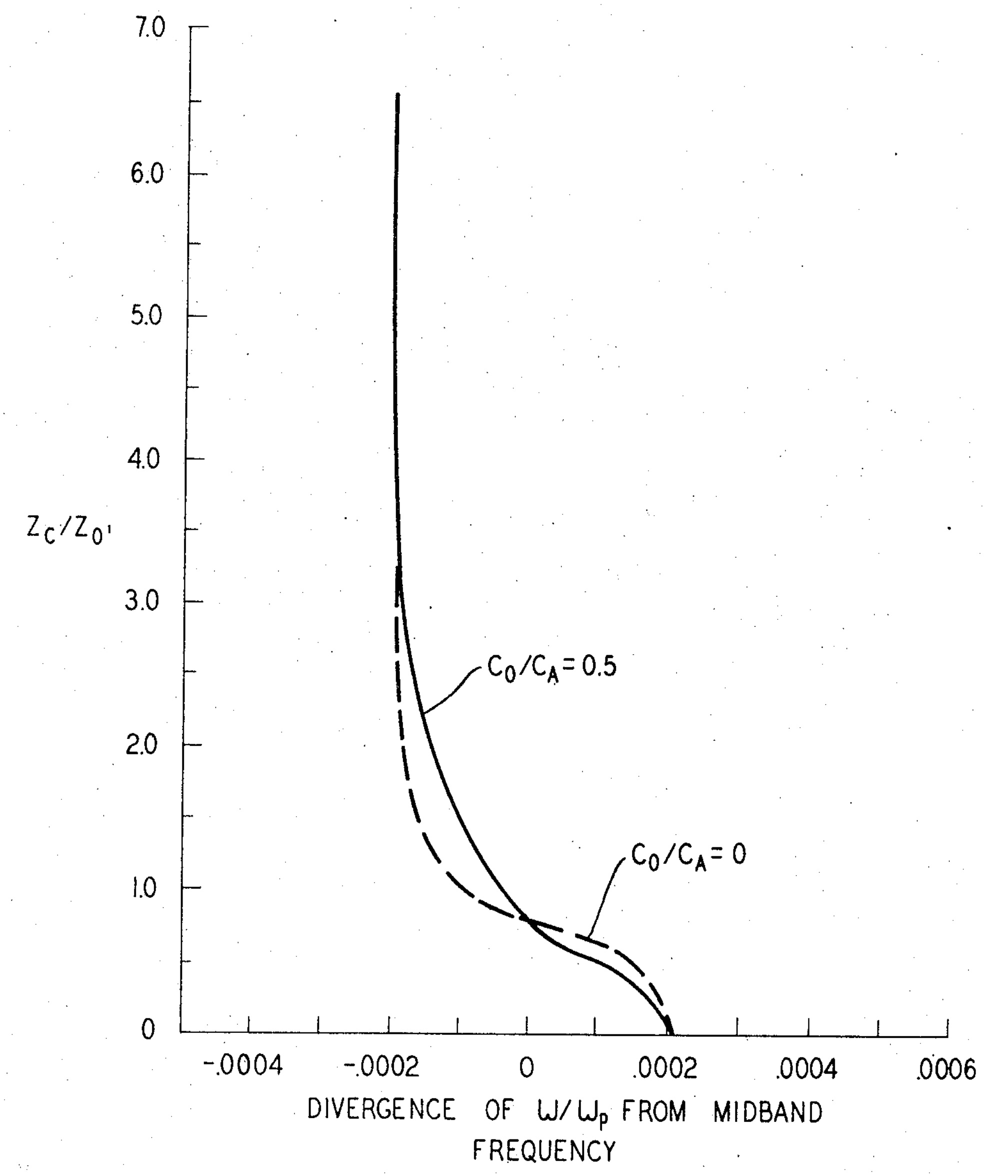
FIG. 10 is a plot showing characteristic impedances of filter bands adjusted to have the same mean band frequency.

By employing the values of $\Gamma l_2$ and $jZ_l/Z'_o$ plotted on FIG. 5 and FIG. 6, the filter parameters can be calculated from Equations (1A) and (1B) by substituting $Z_l$ for $Z_o$ and $\Gamma l_2$ for $\xi l_2$. FIG. 8 shows the effect of shunting a capacitance $C'_A = C_o$ across the terminals when the coupling coefficient is squared; i.e., $k^2$ is 0.0098. The same result is obtained if the $k^2$ is 0.0049 with the element open circuited. This is compared with the short-circuited case $C_o/C_A = 0$, as shown in FIG. 10. The effect of terminating the electrode is to raise the frequency of the passband and to make it somewhat asymmetrical. The dashed line shows the value of $\omega/\omega_p$ for 90° phase shift, whereas the solid lines show the zero and 180° phase shift values.

Figure 9:
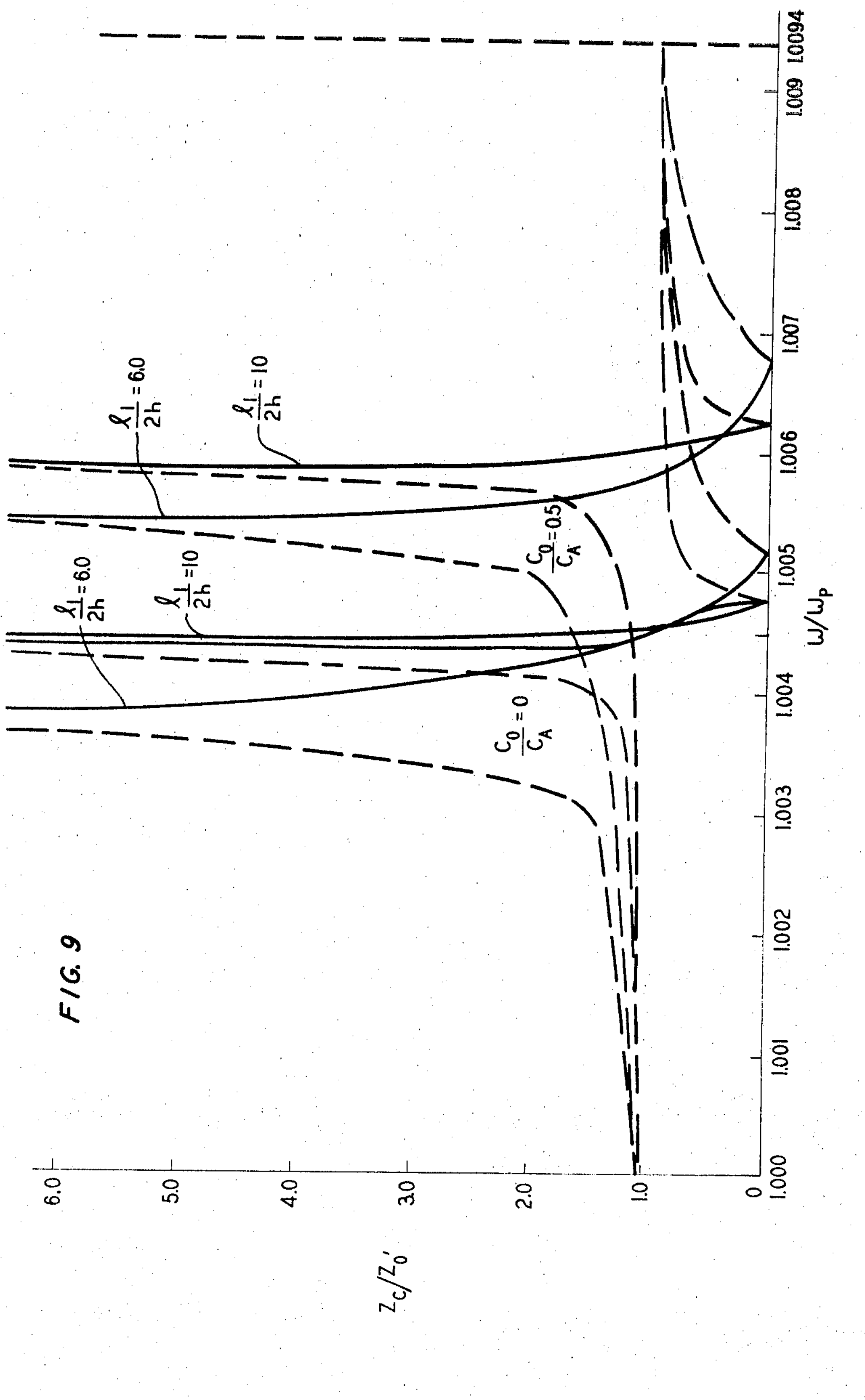
FIG. 9 is a plot of the ratio of characteristic impedances versus frequency for various filter parameters.

The asymmetry is more obvious if the characteristic impedance is calculated from Equations (1A) and (1B). FIG. 9 shows the characteristic impedances for the short-circuited case and for the case where $C_o/C_A = 0.5$. The characteristic impedance is plotted as a ratio of $Z_c$ to $Z'_o$ where $Z'_o$ is the characteristic impedance of the unplated crystal. Since $Z_o$ is a positive reactance outside the passband, the ratio of $Z_c/Z'_o$ is a real number. In the passband, $Z_c$ is resistive, and hence, the ratio is imaginary. It is seen that for the short-circuited case, the characteristic impedance $Z_c$ is fairly symmetrical about the midfrequency, but the characteristic impedance of the shunted electrode section is far from symmetrical. If the passband of this section were lowered by plating more metal on the section until it coincided with the short-circuited section, it is found that the two characteristic impedances would not match and a considerable reflection loss occurs which degrades such a combination. Hence, this method of adjusting bandwidths is desirable only when the ratio of $C_o/C_A$ is small.

The characteristic impedances of FIG. 9 were calculated for the case $l_1/2h = 6$. The curves of FIG. 9 show that raising the band by open-circuiting the adjacent sections on either side effectively places an impedance of 1.65 $Z'_o$ at the resonant frequency of the short-circuited section. This impedance is not sufficiently low to give a very good adjustment of the resonant frequency of the section under consideration and, accordingly, some degree of correction is required.

Less corrections are required, however, when the passband is narrower. Another calculation has been made for the case $l_1/2h = 10$, which produces a passband of 0.0004. These results are also shown in FIG. 9. An extended plot of the characteristic impedances when the two passbands are made to coincide are shown in FIG. 10.

Another problem of some interest occurs in the adjustment of the resonant frequencies of the separate sections. If the two sections on either side are open circuited, they put an impedance $Z_c$ on either side of the half distance $l_1/2$ of FIG. 2. If it is assumed that the ratio of capacitances is 250, which corresponds to the case $C_o/C_A = 0.5$ for the characteristic impedances of FIG. 9, the narrowband value of $Z_c = 1.182\ Z'_o$, while the wideband value is 1.65 $Z'_o$ at the midband of the short-circuited section in which $C_o/C_A = 0$. The impedance adjacent to the trapped energy section is then determined from the following expressions:

$$F = F_o\cosh(\eta l_1/2) - \dot{v}_oZ'_o\sinh(\eta l_1/2) \quad (18)$$

$$\dot{v} = \dot{v}_o\cosh(\eta l_1/2) - (F_o/Z_o)\sinh(\eta l_1/2),$$

where $$F/\dot{v} = x$$

$$x = 1.182\ Z'_o\ (\text{narrow band})$$

$$x = 1.65\ Z'_o\ (\text{wide band}). \quad (19)$$

Eliminating $F/\dot{v}$ and solving for $F_o/\dot{v}_o$, the impedance adjacent to the trapped energy resonator, it is found that, $$\frac{F_o}{\dot{v}_o} = Z_o'\left[\frac{x\cos h\frac{\eta l_1}{2}+\sin h\frac{\eta l_1}{2}}{\cos h\frac{\eta l_1}{2}+x\sin h\frac{\eta l_1}{2}}\right]. \quad (20)$$

In the narrowband section $F_o/v_o = 1.005\ Z'_o$, while for the wideband $F/v_o = 1.02\ Z'_o$. Since $Z'_o$ is a positive reactance, the frequency adjusted in this way will be slightly lower than that for the infinite plate which corresponds to the midfrequency of the filter. Hence, a slight final adjustment is required when the resonant frequency is determined in this manner.

It is to be understood that the embodiment described herein is merely illustrative of the principles of the invention. Various modifications thereto may be effected by persons skilled in the art without departing from the spirit and scope of the invention.

What is claimed is:

1. A monolithic crystal filter comprising, in combination, input and output electrode pairs and at least one intermediate electrode pair, a common piezoelectric wafer sandwiched between each of said pairs, means for applying an electrical signal to said input electrode pair, means for extracting a translation of said electrical signal from said output electrical pair; and a floating, ungrounded, conducting path including a reactive element shunting said one intermediate electrode pair.

2. Apparatus in accordance with claim 1 wherein said element is a capacitor.

3. Apparatus in accordance with claim 1 wherein said element is an inductor.

4. A monolithic crystal filter comprising, in combination, input and output electrode pairs;

a plurality of intermediate electrode pairs;

a common piezoelectrice body sandwiched between each of said pairs, and a floating, ungrounded, conducting path including reactive means shunting at least one of said intermediate electrode pairs;

each of said intermediate electrode pairs not shunted by one of said reactive means being short-circuited.

5. A method for adjusting the bandpass characteristics of a monolithic crystal filter having a piezoelectric body sandwiched between a plurality of pairs of electrodes including an input pair, an output pair, and at least one intermediate pair, comprising the steps of:

open-circuiting those electrode pairs adjacent to the electrode pair of the filter section to be tuned;

adjusting the frequency of said last named section by changing the mass loading thereof, and short-circuiting all intermediate ones of said electrode pairs.

6. A method for adjusting the bandpass characteristics of a monolithic crystal filter having a piezoelectric body sandwiched between a plurality of pairs of electrodes including an input pair, an output pair, and at least one intermediate pair, said method including the steps of:

shunting by reactive means those electrode pairs adjacent to the electrode pair of the section to be tuned, open-circuiting said last named electrode pair, adjusting the frequency of said section to be tuned by adjusting the mass loading of said last named electrode pair, and short-circuiting all of said intermediate pairs.

7. A method for adjusting the resonant characteristics of one section of a multisection monolithic crystal filter wherein said sections include an input electrode pair, an output electrode pair and at least one intermediate electrode pair and each of said electrode pairs sandwiches a common piezoelectric body therebetween, said method including the steps of:

open-circuiting the electrode pair of the section to be adjusted, open-circuiting each of the electrode pairs adjacent to the section to be adjusted, and adjusting the resonant frequency of the section to be tuned by adjusting the mass loading of the corresponding electrode pair.

8. A method for adjusting the resonant characteristics of one section of a multisection monolithic crystal filter wherein said sections include an input electrode pair, an output electrode pair and at least one intermediate electrode pair, and each of said electrode pairs sandwiches a common piezoelectric body therebetween, said method including the steps of:

open-circuiting the electrode pair of the section to be tuned, shunting each of the electrode pairs adjacent to said section to be tuned with a respective reactive element, and adjusting the resonant frequency of said section to be tuned by adjusting the mass loading of said last named electrode pair.

9. The method in accordance with claim 8 further including the steps of:

short-circuiting all of said reactive pairs and removing each of said respective reactive element.

* * * * *